(12) United States Patent
Norris et al.

(10) Patent No.: US 6,179,991 B1
(45) Date of Patent: Jan. 30, 2001

(54) MACHINE AND PROCESS FOR TREATING CONTAMINATED WATER

(76) Inventors: Bruce Norris; Jeffrey Norris; Rolf Flemming; Brian Davis, all of 5250 Gulfton, Suite 3H, Houston, TX (US) 77081

( * ) Notice: Under 35 U.S.C. 154(b), the term of this patent shall be extended for 0 days.

(21) Appl. No.: 09/256,323

(22) Filed: Feb. 23, 1999

(51) Int. Cl.$^7$ .................................................. C02F 1/461
(52) U.S. Cl. ........................ 205/742; 205/743; 204/242; 204/275.1
(58) Field of Search ............................... 205/742, 743; 204/242, 275

(56) References Cited

U.S. PATENT DOCUMENTS 4,105,534 * 8/1978 Beatty, III ............................ 204/630
5,545,310 * 8/1996 Silveri .................................. 205/752

* cited by examiner

Primary Examiner—Arun S. Phasge (57) ABSTRACT

A machine and process for treating contaminated water having a chamber with at least two electrodes having voltages of different polarities and made of metals containing multivalent salts; an inlet port for introduction of untreated contaminated water to the chamber, wherein the water is treated by passing over the electrodes; an outlet port for outputting the treated water from the chamber; and one or more scraper blades in close proximity with the electrodes wherein the blades are capable of movement along the length of the electrodes to remove accumulated debris. A preferred embodiment includes electrodes are made of noble elements and the scraper is affixed in close proximity to the electrode for removal of debris. Another preferred embodiment includes having the electrodes oriented along a vertical flow of the water. Another preferred embodiment includes a drum shaped electrode that rotates about a shaft while it facilitates cleaning of the electrodes. The cleaning motion is motor driven.

17 Claims, 5 Drawing Sheets

MACHINE AND PROCESS FOR TREATING CONTAMINATED WATER

BACKGROUND OF THE INVENTION

This invention relates generally to the field of water treatment, and more particularly to a machine and process for treating contaminated water.

In broad terms, the invention provides a waste treatment process wherein contaminated or waste water to be treated is routed directly past at least two electrodes of different polarity and composed of metals which can form multivalent salts and/or noble metals which will not be dissolved. These electrodes are mechanically cleaned on a continuous basis with a device that automatically travels the length and width of the electrodes making contact with the surface of the electrodes to remove any foreign build up on the electrodes.

In a typical electrolytic treatment process, multivalent electrode metal ions are released during electrolysis. The ions cause flocculation of the contaminates in the waste water to be treated. The floc, in turn, absorbs additional components or impurities present in the contaminated stream, thereby serving as a transport medium to remove the organic, inorganic and metal components from the water. The continuous production of ions for flocculation is maintained by the continuous cleaning of the electrodes to eliminate any build up on the electrodes and aids in a uniform electrode consumption.

The electrolytic process has been in existence for many years. In each case, the process equipment has been plagued with a continuous build up of foreign materials on the electrodes causing the electrolysis reaction to diminish or terminate completely and the result is uneven corrosion of the electrodes. Prior patents have attempted to illustrate the use of non-conductive pellets or balls in a fluidized bed to clean the electrodes. Liquid fluid beds with, for example, a 4 ft/sec. Fluidization velocity, are not adequate to remove the deposits from the electrodes. Other patents have indicated reversing the polarity of the electrodes frequently and increasing the velocity of the feed stream contributes to the cleaning of the electrodes. These inventions have met with limited success because this does not remove the non-conducting deposits on reversal of current and high velocity results in non-treatment of the water. After intermediate operating periods (approximately one week), the electrodes inevitably became coated.

SUMMARY OF THE INVENTION

The primary advantage of the invention is to provide a wastewater treatment process for treating contaminated streams containing organic, inorganic and heavy metals. Another advantage of the invention is to provide a wastewater treatment process that incorporates effective mechanism for cleaning electrodes on a continuous basis. Another advantage of the invention is to provide a water treatment apparatus and method that regularly cleans the electrodes. A further advantage of the invention is to provide a water treatment apparatus and method for controlling the cleaning of corroded electrodes.

Other advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for treating contaminated water having a chamber with at least two electrodes having voltages of different polarities and made of metals which form multivalent salts, an inlet port for introduction of untreated wastewater to said chamber, wherein said wastewater is treated by passing over said electrodes, an outlet port for outputting said treated wastewater from the chamber, and scraper blades in substantial contact with the electrodes wherein the blades move the length of the electrodes to remove accumulated debris.

In accordance with another preferred embodiment of the invention there is disclosed a process for treating contaminated water having the steps of: directing water to be treated into an electrolysis chamber having at least two electrodes having voltages of different polarity and made of multivalent metals; passing untreated water through the chamber and across the electrodes; and scraping the electrodes periodically to remove any accumulated debris that may form on the electrodes.

In accordance with another preferred embodiment of the invention there is disclosed a machine for treating contaminated water having a chamber with a first electrode rotatably mounted on a drive shaft for movement along the length of the chamber and with a second electrode where the electrodes have voltages of different polarities and are made of multivalent metals and an inlet port for introduction of untreated water to said chamber, where the water is treated by passing over the electrodes and an outlet port for outputting the treated water from the chamber and means on the first electrode for cleaning the second electrode during rotation of the first electrode.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
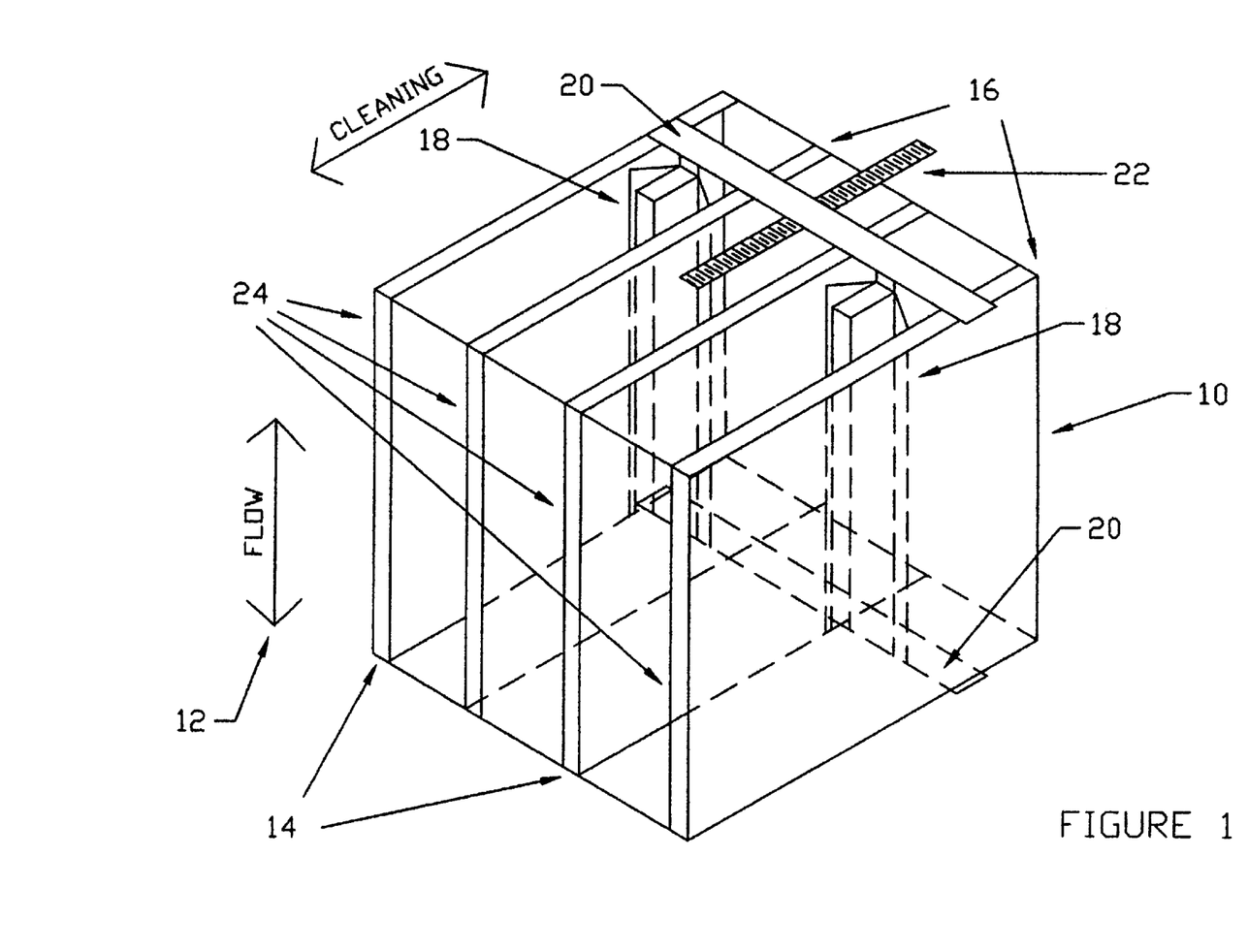
FIG. 1 is a cutaway sectional view of the internals of the water treatment equipment for vertical flow.

Turning now to FIG. 1, there is shown a cut-away perspective view of a vertical flow purification apparatus 10. The contaminated feed or water moves upward as indicated by the flow arrow 12, between the anode 14 and the cathode 16 exiting at the top of the electrodes 24. The spacing of the electrodes is a function of the size of the cleaning device while maintaining the smallest gap possible to reduce power consumption.

The scraper blades 18 are attached to the scraper blade support arm 20 which in turn is attached to the scraper blade support arm shaft 22 which is connected to a mechanical assembly, as more fully described in connection with FIG. 2. The scraper blades are moved across the electrodes at a predetermined rate to assure the cleaning of deposits accumulated during the purification process.

The scraper blades 18 are designed in such a way as to continue to open wider as the electrodes 24 diminish and the gap between the anode and the cathode becomes wider. The blade for the anode is insulated between the blade for the cathode to eliminate any shorting between the anode and the cathode during the cleaning process. Other blade arrangements may be feasible including plastics or other metals, blades and brush combination, chemical washing of electrodes, high pressure washing while operating intermittent withdrawal of an electrode for external cleaning on the way out or back or physical removal for external washing while the remaining electrodes function. The scraper blades do not have to be insulated if used when the electrodes are not energized. For example, if two sets of electrodes are used in series, in which one set of electrodes was de-energized for cleaning and the other set of electrodes continued to operate, the process could then be reversed to clean the other set of electrodes The electrodes are comprised of metals which form multivalent salts, for example, trivalent, or noble metals which conduct electricity but do not dissolve. A wide range of effective electrodes can be utilized such as aluminum, iron, or alloy of such metals, copper, chromium, graphite or carbon. The current flow to the electrodes can be reversed by reversing the direct current voltage. The polarity of each individual electrode is periodically changed within the range of 1 to 100 minutes, so that all electrolytic materials are equally consumed. This also achieves partial cleaning of the electrodes as claimed by other proposals.

The multivalent consumable electrodes can operate as the conventional positive electrode or by substituting the positive electrode with a noble metal electrode and the consumable electrode (aluminum, iron, copper, chrome, etc.) in the negative position. Solutions, suspensions and emulsions can be separated into particles and various liquid phases after flowing through the charged field. For example, in some cases if aluminum or iron is the anode electrode, the negative ions containing the consumable metal can have more affinity for the suspension than the positive ions and therefore are able to collect the flue and the particles more rapidly to facilitate the separation from the liquid phase.

When the electrodes are attached to a direct current power source, the reaction of the waste treatment process can be controlled by varying the voltage of the electrodes as a function of the degree of contaminates in the waste water stream. Energy will be conserved when the feed stream is relatively low in contaminates.

Scraper blades constructed of stainless steel appears most effective in eliminating build up of undesirable material on the surface of the aluminum or other types of electrodes. The scrapper is designed to use the flex in the stainless sheet to apply pressure on the electrode surface and requires approximately 8 lb. Force per inch of scraper blade area to move the scraper blade. A scraper blade that was tested was constructed of $1/16$" thick stainless plate. The electrodes were placed 0.5 inches apart in the electrolytic containment.

The selection of the electrode gap and scrapper blade design is an optimization of the cost of the scraper against the cost of power utilization required to pass the current through the water gap between the electrodes. Typically a $1/4$" gap provides an economical power consumption. Less can restrict the water flow and larger gaps can increase the cost of power. The scraper blade, when utilized in the electrolysis chamber, will provide savings from better uniform utilization of electrode material. Half-inch spacing between electrodes may be justified in order to provide enough room for a scrapper blade with the ability to carry the force required for cleaning at an acceptable operating cost.

Another broad aspect of the present invention in the treatment process includes the measurement and control of the current supplied to the electrodes which indicates the degree of impurities in the waste water feed stream. This may be done by for example, measuring conductivity of the water and adjusting the current proportional to the flow rate and conductivity.

In another broad aspect of the present invention, the flocculated material produced from flowing water containing relatively no impurities through the equipment of the invention, produces a stable flocculating agent which can be stored or inventoried for very long periods. The floc material can be used alone or in conjunction with filter aids to remove trace quantities of impurities to adapt to applications where only small quantities of waste water are to be treated or power is not available.

Particular embodiments may be dependent on the economics to arrive at the best configuration.

EXAMPLE 1

Tests were performed in a vertical electrode assembly with $1/4$" aluminum electrodes 5" wide and 16" length. A 2.25" scrapper blade was used to ream the face of each electrode every 15 minutes for 40 hours. During the testing period, no material build up was observed; no loss of current and no increase in voltage was required.

Figure 2:
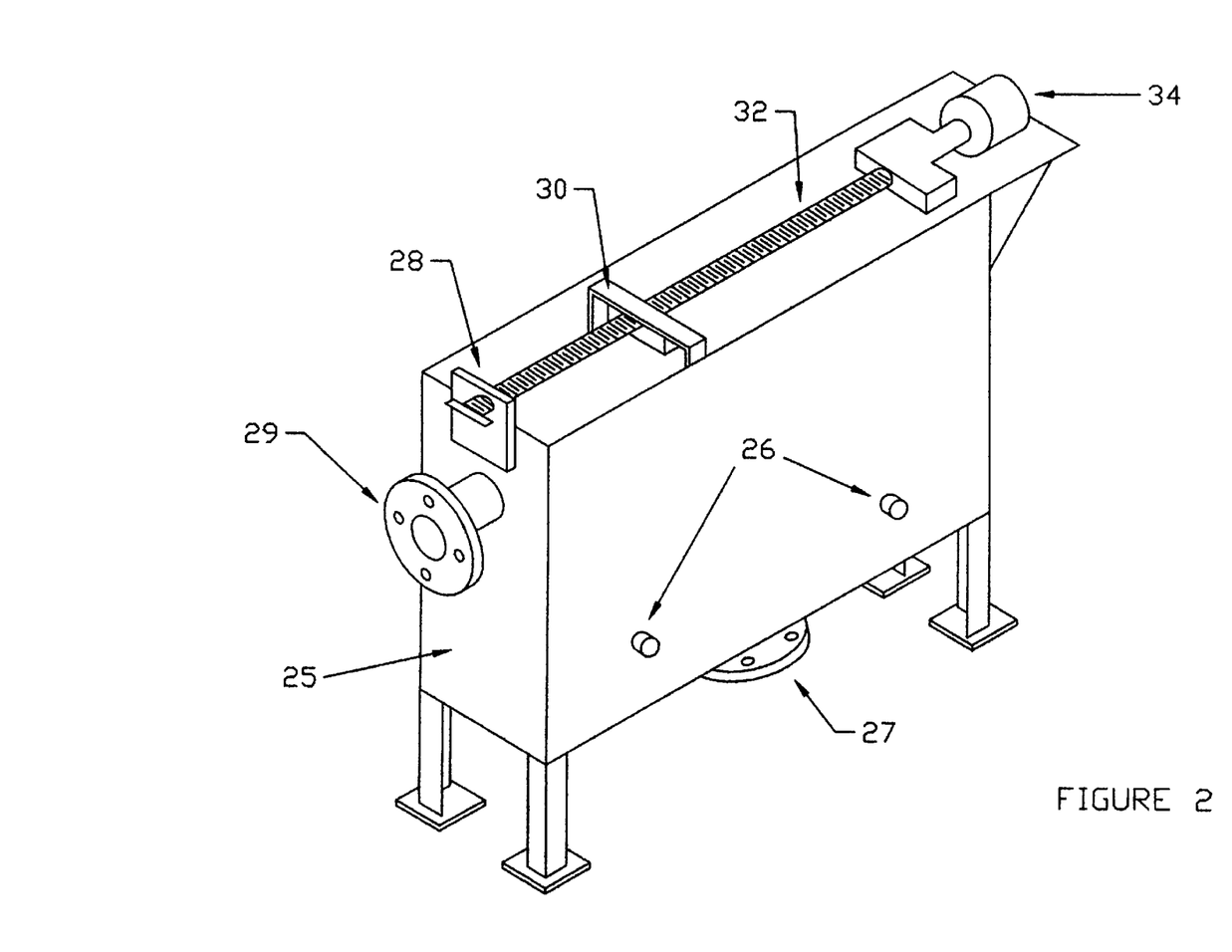
FIG. 2 is a sectional view of the equipment for vertical flow.

FIG. 2 shows a flow chamber 25 with blade movement achieved by a drive motor 34 and a drive shaft 32. The overall dimensions of the chamber are governed by the area to carry the current and apply floc and the total number of different electrode pairs needed to clean a specific feed stream and rate of feed stream.

The process of treating water as shown in FIG. 2 shows the contaminated water entering the feed inlet 27 and moving upward through the electrode assembly as shown on FIG. 1 and then exiting the treated water outlet 29. The drive motor 34 controls the movement of the scraper blades support arm 30 which moves the scraper blades or other cleaning devices across the anode and the cathode such as brushes. The instrument connections 26 are used to monitor and control the process.

A clean water treated water outlet 29 in FIG. 2 is connected to an external vessel (not shown on the drawing) where the remaining flocculation occurs. An instrument (not shown on the drawing) is installed on one side of the inlet conduit 27 upstream of its connection to the electrolytic containment. The instrument controls the power supply to the electrodes.

The electrodes, which typically are made of metals which form multivalent salts, release ions which combine with impurities, both organic and inorganic, to form hydrophobic floc. The flocculent, in turn, absorbs additional impurities, particularly organic colloidal particles, and carries them through the electrolytic chamber. The floc and absorbed impurities are removed through the discharge 29 shown in FIG. 2 of the electrolytic chamber and flow into a settling tank for the separation of the flocculated impurities. The hydrophobic matter is separated in the tank and removed by conventional methods. The flocculated impurities migrate to the top of the settling tank and are removed from the tank by various methods such as raising the liquid level in the tank to float the impurities off or by skimming the impurities off the top of the tank by a skimmer blade. The floated impurities are routed to any type of filter to remove the solids from the liquid. The settled impurity particles are removed from the settling tank by pumping the slurry type impurities to any type of filter to remove the solids from the liquid. Purified water is removed from the tank and is further treated through a filter not shown on the drawing.

Figure 3:
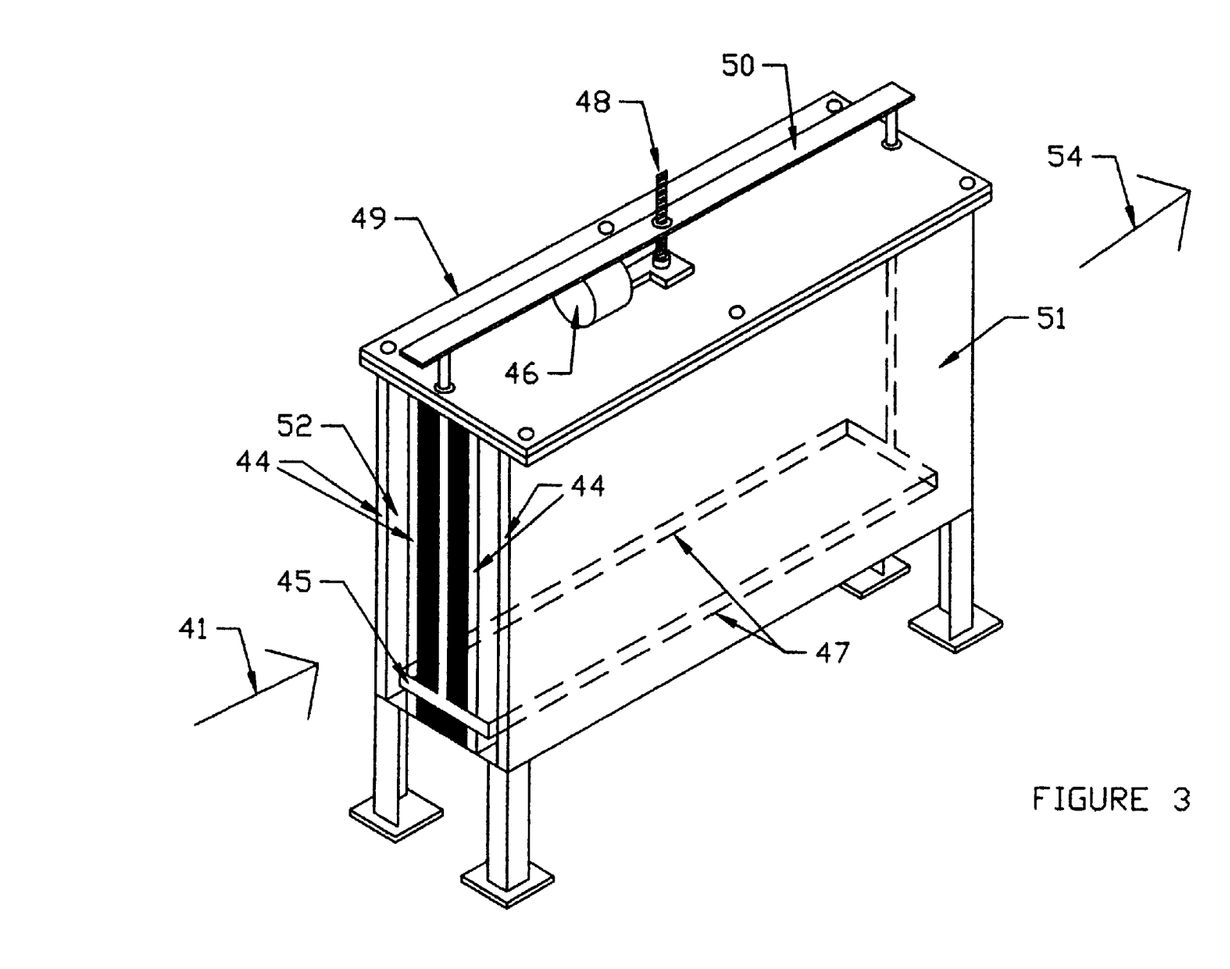
FIG. 3 is a view of the assembled water treatment equipment for horizontal flow.

FIG. 3 shows a horizontal flow process with the blades oriented along the vertical plane with flow as shown in flow arrow 41 through chamber 51. The flange assembly 49 is designed to seal the cell and also provide easy access to the electrodes 44 and scraper blades 47. The motor 46 drives the vertical drive shaft 48 which in turn moves the scraper blade support 50 and support arm 45.

The horizontal feed inlet 52 provides contaminated raw material which moves past the electrodes 44 and exits from the treated water outlet 54. The spacing of the electrodes depends on the size of the cleaning device while maintaining the smallest gap possible to reduce power consumption. The scraper blades 47 are attached to the scraper blade support arm 45 which in turn is attached to the scraper blade support 50. The drive motor 41a controls the movement of the scraper blade support arm 45 and the scraper blade support 50. This mechanical assembly moves the blades across the electrodes at a predetermined rate to assure the cleaning of accumulated deposits during the purification process. The scraper blades are designed in such a way as to continue to open wider as the electrodes 44 diminish and the gap between the anode and the cathode becomes wider. The cleaning blade for the anode is insulated from the blade for cleaning the cathode to eliminate any shorting between the anode and the cathode during the cleaning process if the cleaning is performed when the electrodes are energized.

FIG. 2 further shows contaminated waste water flowing through the inlet conduit 27 to the electrolytic chamber. When the waste water passes the electrodes, the degree of conductivity in the waste water is determined. The conductivity adjusts the power supply to the electrodes. The waste water flows at the design rate of the unit.

The effectiveness of the electrodes 44 in FIG. 3 is ensured by the continuous cleaning of the electrodes by the mechanical cleaning device. The cleaning devices move between the electrodes in an even upward and downward motion cleaning the undesirable deposits from the entire surface of the electrode. The cleaning of the electrodes is necessary not only when high concentration of contaminated waste water is treated but also when relatively uncontaminated raw water is processed. Due to the cleaning motion of the devices, a thin film of non-conducting solids is continuously removed from the electrodes, which would otherwise deposit a coating on the electrodes and decrease the ion release.

In line instruments can be used to measure or sense the degree of contamination for example, conductivity in the wastewater. This conductivity instrument can be used to control the current supply to the electrodes.

Electrodes made of dissimilar materials can be utilized without departing from the scope of this invention. Such electrodes can use the battery effect to release ions without being energized from an outside source of energy.

The use of a noble electrode as an anode opposite a flocculating metal (e.g. Aluminum) electrode as the cathode can improve the flocculation process by creating negative Aluminum ion complexes. Some particulate does not respond as well to the positive ions but does coagulate with negative ions. Examples of negative and positive ion complexes are shown below::

| | |
|---|---|
| $Al^{+++}$ | $AlO_2^-$ |
| $AlOH^+$ | $Al(OH)_4$ |
| $Fe^{++}$ or $Fe^{++}$ | $FeO_2^-$ |
| $FeOH^*$ or $FeOH^{**}$ | $Fe(OH)^-$ |
| $Fe_2(OH)_2^{++++}$ | $Fe(OH)_3^-$ and $Fe(OH)_4^-$ |

The following is an example illustrating that types of electrodes other than aluminum can be used to obtain the same results:

A graphite anode electrode was installed in an electrolysis containment ¼" from an aluminum cathode electrode. After 2 hours and 45 minutes, the cathode electrode had lost 1.5 grams of aluminum. The theoretical loss was calculated at 1.58 grams verifying that the current efficiency with the aluminum as the cathode electrode was high in spite of forming negative ions.

A second example illustrates that Iron is preferred over all in acid pH ranges.

Similar results were obtained from testing a sample of saturated aluminum sulfate containing very fine particles of titanium dioxide. The sample could not be flocculated by utilizing conventional aluminum electrodes in the electrolysis process. A combination of an iron cathode electrode and a graphite anode electrode did produce the flocculation of the titanium dioxide and a clear liquid solution which required no filtration.

Examples of Laboratory Testing and the Results Obtained Verify the Efficacy of the Process Test 1 verifies that oxidation build up still occurs on the electrodes when reversing the polarity to the electrodes.
    Electrodes: Anode=aluminum. Cathode=aluminum.
    Spacing between electrodes: ½ inch.
    Electrode size: ¼"×3"×16".
    Length of test: 8 hours.
    Requirements: Reverse polarity every 5 minutes.
    Amperage: 5.
    Direct current.
    Liquid to be treated: City water.
    Flow rate: 1 Gallon per minute.
Results:
    Electrodes were checked for oxidation build up every hour.
    Hours 1 through 4: No build up. Electrodes clean.
    Hour 5: Light coating of white deposit on both electrodes. Voltage was increased to maintain the 5 amps.
    Hour 6: White deposit seems to be heavier. Voltage was continuously being adjusted upward to maintain the 5 amps.
    Hour 7: Both electrodes now complete covered with white deposit. Voltage was still increased to maintain the 5 amps.
    Hour 8: Stopped test at end of Hour 8 due to not enough voltage available to maintain the 5 amps.
Conclusion: The historical method of reversing polarity to help clean the electrodes did not prevent the eventual build up of oxidation which eventually has to be removed in order to continue the water treatment process.
Test 2 verifies that oxidation buildup did not occur on the electrodes when a mechanical cleaning device was used to scrape the electrodes.

Electrodes: Same as Test 1.
Spacing between electrodes: Same as Test 1.
Electrode size: Same as Test 1.
Length of test: Same as Test 1.
Requirements: Use mechanized cleaning device the same width as the electrodes. Clean both the anode electrode and the cathode electrode at 5 minute intervals.
Amperage: 5.
Direct current.
Liquid to be treated: City water.
Flow rate: 1 gallon per minute.
Results:
Electrodes were checked for oxidation build up every hour.
Hours 1 through 8: No build up.
Continued to run test checking the electrodes every hour for 17 additional hours.
At hour 25 the electrodes were both very clean.
Conclusion: The mechanical cleaning of the plates on a continuous basis eliminates the historical problem of oxidation build up on the electrodes. The cleaning was accomplished without interrupting the process or shutting down the electrolytic reaction.

Figure 4:
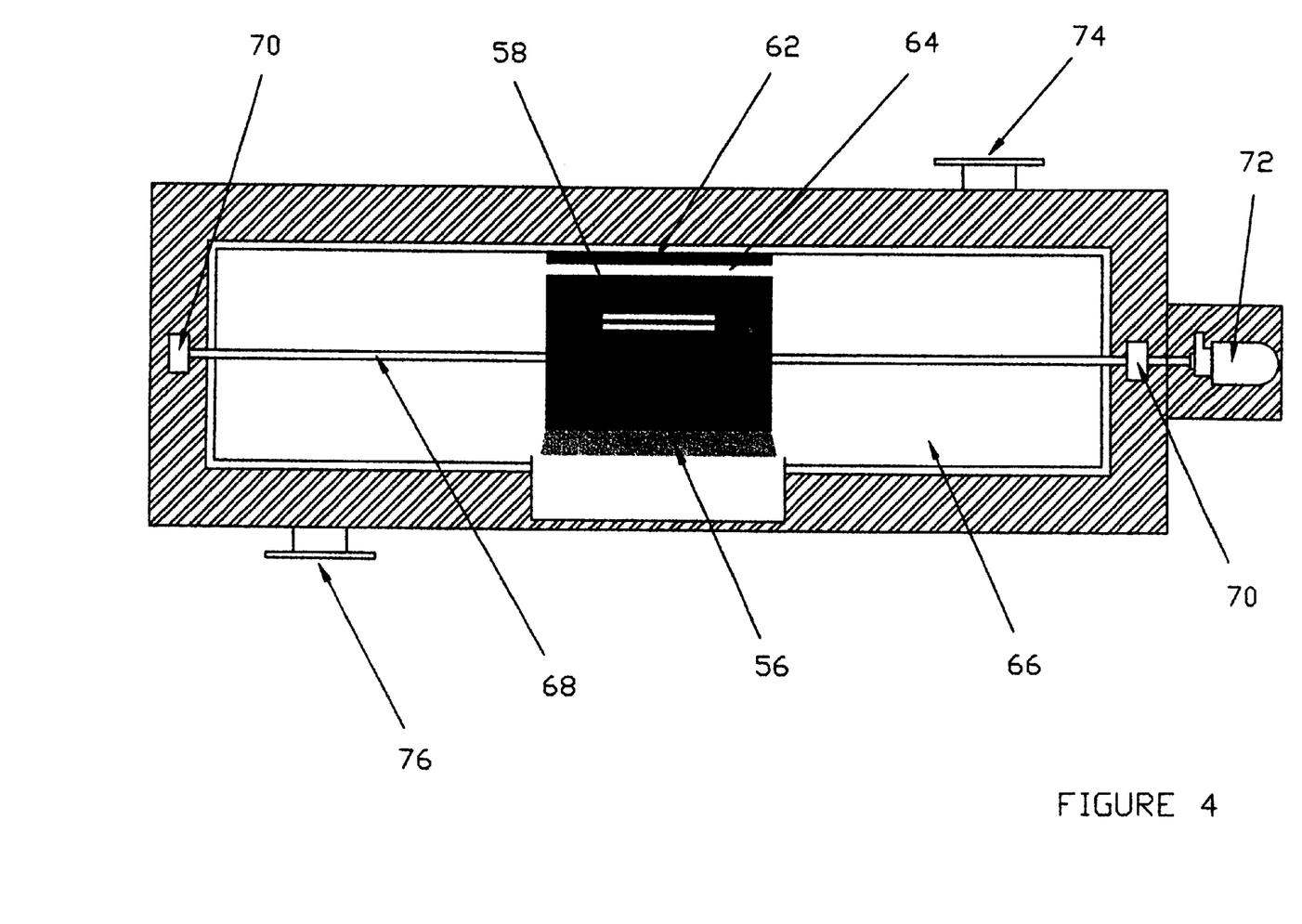
FIG. 4 is a cross sectional view of a water treatment chamber with rotary cleaning devices according to the invention.
Figure 5:
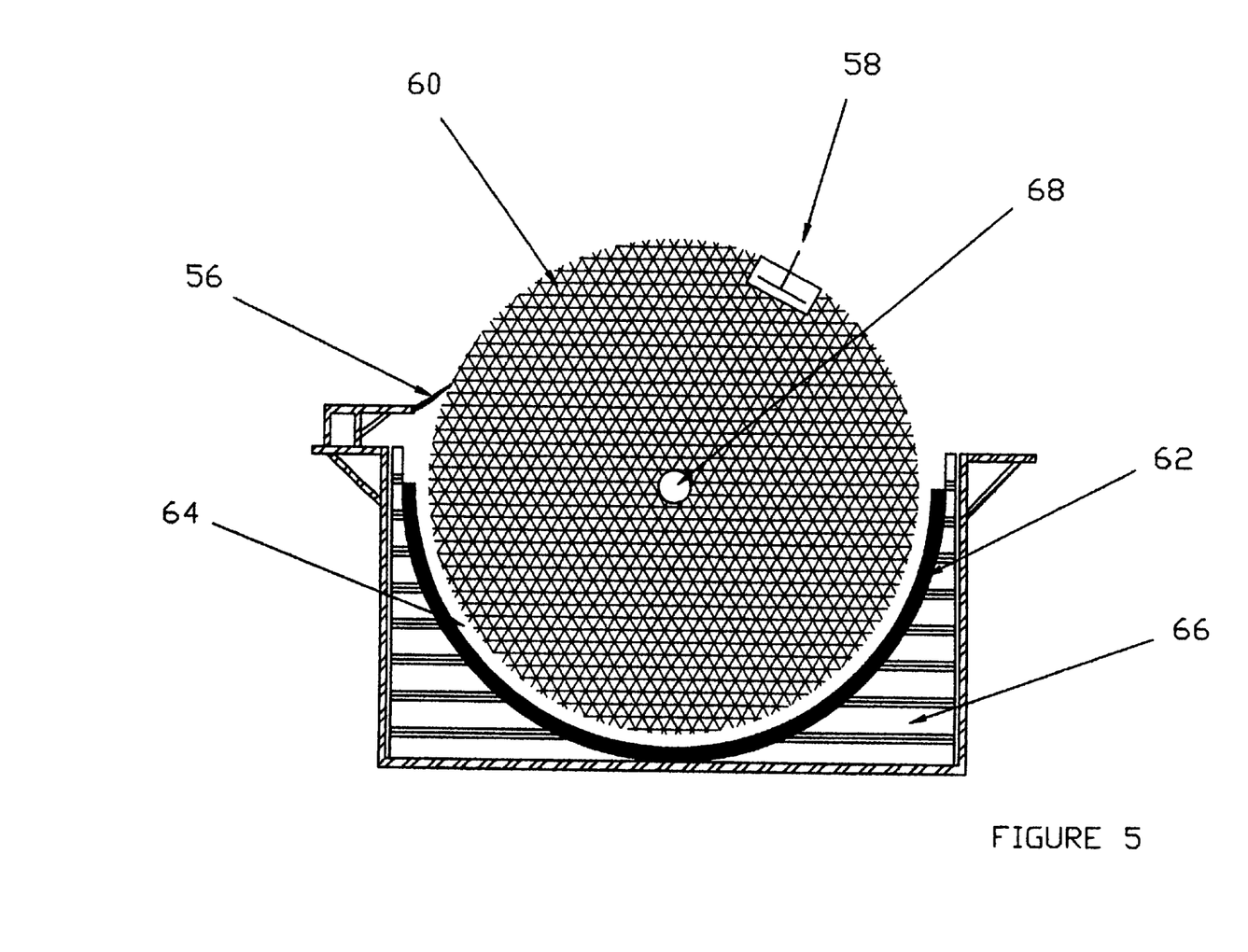
FIG. 5 is a cross sectional view of a rotary cleaning device according to the invention.

Turning now to FIGS. 4 and 5, there is shown another preferred embodiment utilizing a rotary drum electrode and cleaning scrapers. The contaminated liquid enters through the flow inlet 74 and flows through the electrolytic treatment zone 64 between the rotary drum electrode 60 shown in FIG. 5 and the bottom electrode 62. The liquid leaving the electrolytic treatment zone 64 then exits through the flow outlet 76. The rotary drum electrode 60 rotates on the rotary drum electrode drive shaft 68 until the bottom electrode cleaning device 58 cleans the entire area of the bottom electrode 62 but stops before making contact with the rotary drum cleaning device 56. The rotary drum electrode 60 would then reverse directions and clean the bottom electrode 62 and continue in that cycle. Alternatively, the rotation of the rotary drum electrode may be continuous in one direction by utilizing a cam to pick up the rotary drum electrode cleaning device 56 until the bottom electrode cleaning device 58 passes by the rotary drum electrode cleaning device 56 which may be in a fixed position and will continuously clean the rotary drum electrode 60 as it rotates around the bottom electrode 62. The rotary drum electrode drive motor 72 turns the rotary drum electrode drive shaft 68. The revolutions per minute can be adjusted to assure maximum cleaning of the electrodes. The rotary drum electrode 60 can be adjusted up or down to maintain the required clearance between the bottom electrode 62 and the rotary drum electrode 60 is consumed. The rotary drum drive shaft bearing 70 allows the rotary drum electrode 60 to spin freely and maintain the required gap in the electrolytic treatment zone.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for treating contaminated water comprising:
   a chamber with at least two electrodes having voltages of different polarities and made of multivalent metals;
   an inlet port for introduction of untreated water to said chamber, wherein said water is treated by passing over said electrodes;
   an outlet port for outputting said treated water from said chamber; and
   one or more scraper blades in substantial contact with said electrodes wherein said blades are capable of movement along the length of said electrodes to remove accumulated debris.

2. A machine for treating water as claimed in claim 1 wherein said scrapers are moved in substantial contact with said electrode for removal of debris.

3. A machine for treating water as claimed in claim 2 wherein said electrodes are oriented along the horizontal flow of the water.

4. A machine for treating water as claimed in claim 2 wherein said electrodes are oriented along a vertical flow of the water.

5. A machine for treating water as claimed in claim 4 wherein said movement is computer controlled.

6. A machine for treating water as claimed in claim 5 wherein said movement is by a motor.

7. A process for treating contaminated water comprising the steps of:
   directing untreated water to be treated into an electrolysis chamber with at least two electrodes having voltages of different polarity and made of multivalent metals;
   passing untreated water though the chamber and across the electrodes; and
   scraping said electrodes periodically by scrapers in substantial contact with said electrodes to remove any accumulated debris that may form on said electrodes during the treatment of the water.

8. A process for treating water as claimed in claim 7 further comprising the step of controlling said scraper with a timer.

9. A process for treating wastewater as claimed in claim 8 further comprising the step of driving a control bar in operable connection to a drive motor.

10. A process for treating wastewater as claimed in claim 9 wherein said control bar is driven by a worm screw.

11. A machine for treating contaminated water comprising:
   a chamber with a first electrode rotatably mounted on a drive shaft for movement along the length of the chamber and with a second electrode said electrodes having voltages of different polarities and made of multivalent metals;
   an inlet port for introduction of untreated water to said chamber, wherein said water is treated by passing over said electrodes;
   an outlet port for outputting said treated water from said chamber; and
   means on said first electrode for cleaning said second electrode by maintaining substantial contact with said second electrode during rotation of the first electrode.

12. A machine for treating contaminated water as claimed in claim 11 further comprising a scraper mounted in said chamber to engage the first electrode for cleaning said electrode of debris.

13. A machine for treating contaminated water comprising:
   a chamber with at least two electrodes having voltages of different polarities;
   said first electrode is an anode made of a noble metal;
   said second electrode is a cathode made of a multivalent metal;
   an inlet port for introduction of untreated water to said chamber, wherein said water is treated by passing over said electrodes;

an outlet port for outputting said treated water from said chamber; and one or more scraper blades in substantial contact with said electrodes wherein said blades are capable of movement along the length of said electrodes to remove accumulated debris.

14. The machine as claimed in claim 13 wherein said multivalent metal is aluminum.

15. The machine as claimed in claim 13 wherein said multivalent metal is iron.

16. The machine as claimed in claim 13 wherein said multivalent metal is copper.

17. The machine as claimed in claim 13 wherein said multivalent metal is chrome.

* * * * *